United States Patent [19]

Shimizu

[11] Patent Number: 4,888,512
[45] Date of Patent: Dec. 19, 1989

[54] SURFACE MULTIPOLAR RARE EARTH-IRON-BORON ROTOR MAGNET AND METHOD OF MAKING

[75] Inventor: Motoharu Shimizu, Kumagaya, Japan

[73] Assignee: Hitachi Metals, Ltd., Tokyo, Japan

[21] Appl. No.: 178,212

[22] Filed: Apr. 6, 1988

[30] Foreign Application Priority Data

Apr. 7, 1987 [JP] Japan .................................. 62-85531
Dec. 21, 1987 [JP] Japan .................................. 62-323347

[51] Int. Cl.$^4$ ..................... H02K 21/06; H01F 7/02; C22C 75/246
[52] U.S. Cl. ..................... 310/156; 148/104; 310/44; 335/302; 419/29; 420/83
[58] Field of Search ............... 148/103, 104; 252/62.51; 310/154, 156, 44; 335/284, 302, 306; 419/12, 29; 29/598; 420/83

[56] References Cited

U.S. PATENT DOCUMENTS

| | | | |
|---|---|---|---|
| 4,010,434 | 3/1977 | Kools | 335/302 |
| 4,547,758 | 10/1985 | Shimizu et al. | 335/302 |
| 4,597,938 | 7/1986 | Matsuura et al. | 75/244 |
| 4,600,555 | 7/1986 | Shimizu | 335/302 |
| 4,601,875 | 7/1986 | Yamamoto et al. | 419/29 |
| 4,628,809 | 12/1986 | Das et al. | 148/103 |
| 4,642,502 | 2/1987 | Carpenter et al. | 310/156 |
| 4,684,406 | 8/1987 | Matsuura et al. | 420/83 |
| 4,737,674 | 4/1988 | Miyao | 310/156 |
| 4,755,701 | 7/1988 | Shikama | 310/156 |

Primary Examiner—Patrick R. Salce
Assistant Examiner—D. L. Rebsch
Attorney, Agent, or Firm—Finnegan, Henderson, Farabow, Garrett & Dunner

[57] ABSTRACT

A cylindrical permanent magnet of from 4-48 poles containing, as major components, R (R is at least one rare earth element selected from Nd, Pr, Dy, Ho and Tb and may further contain at least one rare earth element selected from La, Ce, Sm, Gd, Er, Eu, Tm, Yb and Y), B and Fe, and having multipolar anisotropy at the surface without suffering from cracking. The ratios of inner and outer magnet diameters are established as functions of the number of poles. Bushings of ferromagnetic materials allow for reduced permanent magnet thicknesses.

16 Claims, 4 Drawing Sheets

FIG. I
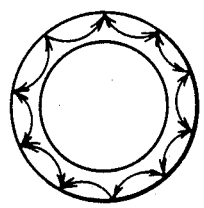
FIG. 2
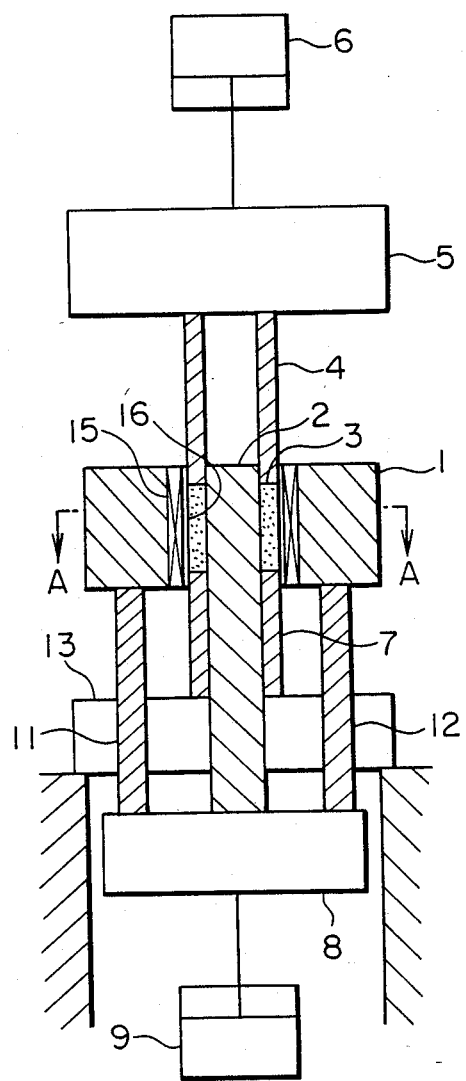

SURFACE MULTIPOLAR RARE EARTH-IRON-BORON ROTOR MAGNET AND METHOD OF MAKING

BACKGROUND OF THE INVENTION

The present invention relates to a cylindrical permanent magnet having multipolar anisotropy and more particularly to a cylindrical permanent magnet having multipolar anisotropy at the surface with a large magnetic force but no danger of cracking.

Cylindrical permanent magnets having a large number of magnetic poles are in wide use in, for example, the rotor of stepping motor. Such magnets are known as cylindrical permanent magnets having anisotropy in a radial direction. Typical examples of these cylindrical permanent magnets include one made of ferrite (U.S. Pat. No. 4,010,434) and one made of a rare earth element and cobalt (Japanese Pat. Publication No. 59-23448).

Cylindrical permanent magnets having a large number of magnetic poles at the surface have recently been proposed as magnets having more magnetic poles and a larger magnetic force than the above-mentioned cylindrical permanent magnets having anisotropy in a radial direction, and are in practical use. For example, U.S. Pat. No. 4,547,758 discloses a sintered cylindrical permanent magnet having a composition of $MO.nFe_2O_3$ (M is Ba, Sr or Pb and n is 5 to 6) and having at least 8 magnetic poles at the surface. In this magnet, the magnetic flux flows between magnetic poles in a form of circular arcs as shown in FIG. 1 and the particles having magnetic anisotropy are aligned substantially along the circular arcs; therefore, the magnet can have not only a remarkably increased pole density but also a larger magnetic force.

In order to further increase the magnetic force of the cylindrical permanent magnet having multipolar anisotropy at the surface attempts have been made, to form a sintered magnet using a rare earth element-cobalt alloy in place of ferrite. However, the resulting rare earth element-cobalt cylindrical permanent magnet having multipolar anisotropy at the surface have a tendency to form cracks. The reason for this cracking is believed to be that the sintered body has insufficient strength to withstand the thermal stress as generated during sintering.

OBJECT AND SUMMARY OF THE INVENTION

Hence, an object of the present invention is to provide a cylindrical permanent magnet having multipolar anisotropy at the surface and a large magnetic force.

Another object of the present invention is to provide a motor comprising a cylindrical permanent magnet having multipolar anisotropy at the surface and a large magnetic force.

A further object of the present invention is to provide a process for producing such a cylindrical permanent magnet.

In order to achieve the above objects, the present inventor has made extensive research and found that a cylindrical permanent magnet having multipolar anisotropy at the surface, a large magnetic force and resistance to cracking can be obtained by subjecting an R-Fe-B alloy powder to compacting in a magnetic field, sintering the resulting green body and then magnetizing the resulting sintered body so as to have a large number of magnetic poles at the surface. This finding has led to the completion of the present invention.

According to the present invention, there is provided a cylindrical permanent magnet containing, as major components, R (R is at least one rare earth element selected from Nd, Pr, Dy, Ho and Tb and may further contain at least one rare earth element selected from La, Ce, Sm, Gd, Er, Eu, Tm, Yb and Y), B and Fe and having multipolar anisotropy at the surface.

According to the present invention, there is further provided a dc motor for a hard disk drive, comprising a cylindrical permanent magnet containing, as major components, R (R is at least one rare earth element selected from Nd, Pr, Dy, Ho and Tb and may further contain at least one rare earth element selected from La, Ce, Sm, Gd, Er, Eu, Tm, Yb and Y), B and Fe and having 4 to 12 magnetic poles at the outer surface.

According to the present invention, there is furthermore provided a capstan motor for a streamer tape drive, comprising a cylindrical permanent magnet containing, as major components, R (R is at least one rare earth element selected from Nd, Pr, Dy, Ho and Tb and may further contain at least one rare earth element selected from La, Ce, Sm, Gd, Er, Eu, Tm, Yb and Y), B and Fe and having 4 to 12 magnetic poles at the outer surface.

According to the present invention, there is furthermore provided an inner hub spindle motor for a hard disk drive, comprising a cylindrical permanent magnet containing, as major components, R (R is at least one rare earth element selected form Nd, Pr, Dy, Ho and Tb and may further contain at least one rare earth element selected from La, Ce, SM, Gd, Er, Eu, TM, Yb and Y), B and Fe and having 4 to 12 magnetic poles at the inner surface.

According to the present invention, there is furthermore provided a process for producing a cylindrical permanent magnet, which comprises filling a cylindrical cavity with an alloy powder containing, as major components, R (R is at least one rare earth element selected from Nd, Pr, Dy, Ho and Tb and may further contain at least one rare earth element selected from La, Ce, Sm, Gd, Er, Eu, Tm, Yb and Y), B and Fe, subjecting the powder filled in the cavity to compacting while applying a pulse magnetic field to obtain a cylindrical green body having a multipolar anisotropy at the surface, inserting into the inside of the cylindrical green body a column whose diameter is slightly larger than the inner diameter of the sintered body that would result if the column were not used, and then sintering the green body, heat-treating the resulting sintered body, and magnetizing the surface of the sintered body in the same directions as the magnetic poles formed at the surface.

BRIEF EXPLANATION OF THE DRAWINGS

FIG. 1 is a view showing the flow of magnetic flux in a cylindrical permanent magnet having a large number of magnetic poles at the surface;

FIG. 2 is a schematic sectional view showing an example of a molding apparatus used in the production of the cylindrical permanent magnet of the present invention;

FIG. 4(B) is a sectional view showing a cylindrical permanent magnet having a bushing fixed on the outer surface thereof;

DETAILED DESCRIPTION OF THE PREFERRED EMBODIMENTS

Figure 3:
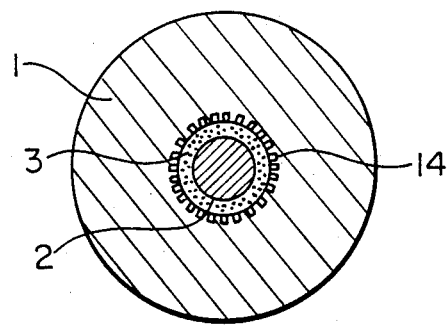
FIG. 3 is a sectional view taken along the A—A line of FIG. 2.

The cylindrical permanent magnet of the present invention contains, as major components, R (R is at least one member of rare earth elements including Nd), B and Fe, and has multipolar anisotropy at the surface.

As the rare earth elements R used in the cylindrical permanent magnet of the present invention, there are ordinarily used light rare earth elements such as Nd and Pr, and Nd is used in most cases. For the purpose of the improvement of coercive force and heat resistance, for example, part (1 to 30%) of R can be replaced by heavy rare earth elements such as Dy, Ho and Tb. R can further contain at least one member selected from La, Ce, Sm, Gd, Er, Eu, Tm, Yb and Y. The content of the rare earth elements in the cylindrical permanent magnet is desirably in the rage of 10 to 30 atomic %. When R is less than 10 atomic %, the resulting cylindrical permanent magnet has low magnetic properties, particularly a low coercive force, and when R is more than 30 atomic %, the cylindrical permanent magnet contains an R-rich, non-magnetic phase in a large amount and has a low residual magnetic flux density.

The content of B in the cylindrical permanent magnet of the present invention is desirably in the range of 2 to 28 atomic %. When B is less than 2 atomic %, the resulting magnet has a low coercive force, and when B is more than 28 atomic %, the magnet contains a B-rich, non-magnetic phase in a large amount and has a low residual magnetic flux density.

The content of Fe is desirably ni the range of 65 to 80 atomic %. When Fe is less than 65 atomic %, the magnet has a low residual magnetic flux density, and when Fe is more than 80 atomic %, the magnet has a low coercive force.

The cylindrical permanent magnet of the present invention may contain, in addition to the above-mentioned essential components, impurities (e.g. $O_2$) which inevitably come into existence through the production process. The cylindrical permanent magnet of the present invention can further contain additive elements (e.g. Co, Al, Ti, etc.) which are commonly used in R-Fe-B type magnets.

The cylindrical permanent magnet having multipolar anisotropy at the surface according to the present invention is produced as follows.

First, the production of a molten R-Fe-B alloy is conducted in an Ar atmosphere or in vacuum according to an ordinary method. It is possible to use ferroboron in place of B. Preferably, the rare earth elements R are added last.

Pulverizing of the resulting alloy consists of two steps, namely, coarse pulverizing and fine pulverizing. The coarse pulverizing is conducted by the use of a stamp mill, a jaw crusher, a Brown mill, a disk mill or the like, and the fine pulverizing is conducted by the use of a jet mill, a vibration mill, a ball mill or the like. Each pulverizing is conducted in a non-oxidizing atmosphere in order to avoid the oxidation of the resulting powder. Therefore, the use of an organic solvent or an inert gas is preferable. The particle size of the powder obtained is preferably 2 to 5 $\mu$m (Fs.s).

Compaction of the magnetic powder obtained is conducted using a die capable of providing the green body with multipolar anisotropy at the surface. FIG. 2 shows an example of a compacting apparatus usable in the present invention. The compacting apparatus has a die 1 made of a magnetic material and a core 2 made of a non-magnetic material provided in a columnar space formed by the die 1 concentrically therewith. The die 1 is supported by supports 11 and 12, and the core 2 and the supports 11 and 12 are supported by a lower frame 8. Into an annular cavity 3 between the die 1 and the core 2 are fitted a cylindrical upper punch 4 made of a non-magnetic material and a cylindrical lower punch 7 made of a non-magnetic material. The lower punch 7 is fixed to a base 13 and the upper punch 4 is fixed to an upper frame 5. The upper frame 5 and the lower frame 8 are connected to an upper hydraulic cylinder 6 and a lower hydraulic cylinder 9, respectively.

Figure 4:
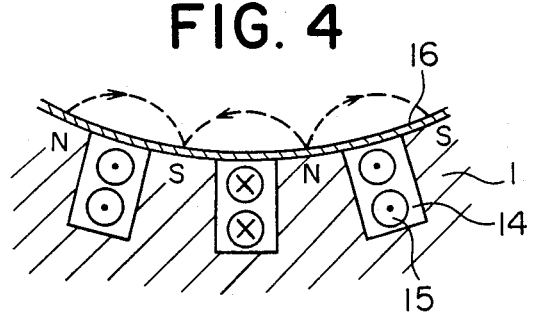
FIG. 4 is a partially enlarged view of FIG. 3.

FIG. 3 is a sectional view taken along the A—A line of FIG. 2 and shows the above-mentioned cavity. The circular inner surface of the die 1 has a plurality of grooves 14, and in each groove 14, coils for generation of magnetic field are embedded as shown in FIG. 4. On the inner surface of the die 1 is provided a cylindrical spacer 16 made of a non-magnetic material so as to cover the grooves 14. The space formed by the cylindrical spacer 16 and the core 2 serves as a cavity 3. In FIG. 4, ⊙ denotes that electricity flows through the coil downward with respect to the the paper, and ⊗ denotes the opposite flow. Since the coils 15 embedded in each groove 14 for generating a magnetic field are connected so that electricity flows therethrough in opposite directions alternately, magnetic fluxes as shown by the arrows in FIG. 4 appear in the cavity 3, thus forming alternately changing magnetic poles S, N, S, N, ... on the inner surface of the die 1.

Next, the production of a cylindrical permanent magnet using the compacting apparatus of FIG. 2 is described.

With the punch 4 lifted, an R-Fe-B alloy powder is charged in the cavity 3 by a feeding means (not shown) such as a vibration feeder or the like. Then, a pulse current is applied to the coils 15 for generating a magnetic field to orient the ferromagnetic powder to the directions of the resulting magnetic fields. Subsequently, the upper punch 4 is lowered and the R-Fe-B alloy powder is subjected to compacting while applying a pulse current to the coils 15. In this case, the pulse magnetic fields generated are desirably in the range of 5 to 25 KOe. While the powder is under compression, a pulse current of opposite direction is passed through the coils 15, whereby the green body is demagnetized. Thereafter, the green body is taken out of the die. The compacting pressure is 500 to 2,000 kg/cm². The green body is then sintered. This sintering is conducted in an inert gas such as Ar, He or the like, or in vacuum, or in hydrogen at 950–1,150° C. for 20 minutes to 2 hours.

After sintering, the sintered body is given, if necessary, an appropriate heat treatment in an inert atmosphere. Preferable heat treatment conditions are 600° C. and 1 hour.

Finally, the sintered body is magnetized in the same directions as the orientation directions of the magnetic powder.

The thus obtained R-Fe-B type cylindrical permanent magnetic having multipolar anisotropy at the surface can have a surface magnetic flux density ($B_0$) of about 3,000 g when the magnet has, for example, an outer diameter of 20 mm and 24 magnetic poles. Further, the magnet has no cracks in spite of such multipolar anisotropy formed at the surface. The reason for no cracks is believed to be that the sintered magnet has a strength high enough to withstand the heat stress generated during sintering owing to the surface multipolar anisotropy imparted to the green body.

The cylindrical permanent magnet of the present invention (hereinafter also referred to as the cylindrical magnet) is ordinarily used in the stator or rotor of permanent magnet motor. In this case, the cylindrical magnet has an outer diameter of 30 mm or below in many cases. Since the cylindrical magnet used in motors has at least 2 magnet poles and in many cases at least 4 magnet poles, explanation will be made below with respect to applying the present invention to a cylindrical magnet for motor having at least 4 magnet poles.

In order to obtain a high motor efficiency, the cylindrical magnet should have a surface magnetic flux density (hereinafter also referred to as $B_0$) as high as possible. $B_0$ increases with the increase of the thickness of the magnet, but it is known that $B_0$ becomes saturated when the thickness reaches a certain level. Meanwhile, since the R-Fe-B type magnets are expensive as compared with the conventional magnets, the cylindrical magnet of the present invention is required to have a small thickness in order to save the material.

Figure 5A:
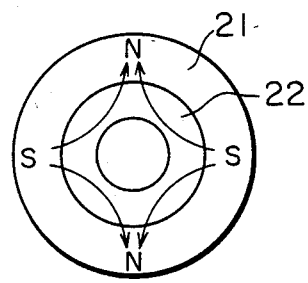
FIG. 5(a) is a sectional view showing a cylindrical permanent magnet having a bushing fixed on the inner surface thereof.

The present inventor conducted investigations to obtain a cylindrical magnet of low cost and found that such a magnet can be obtained by fixing to the inner surface of a cylindrical magnet 21 a bushing 22 made of a ferromagnetic material such as iron, steel or the like, as shown in FIG. 5(a). It was found that by employing such a structure, a high $B_0$ can be obtained even when the thickness of the cylindrical magnet is small. However, use of the bushing is not necessary when the outer diameter of the cylindrical magnet is not large (15 mm or below), because in this case the cost of the magnet is not high even if the thickness of the magnet is relatively large.

Rare earth element magnets such as R-Fe-B type magnet cannot be magnetized easily as compared with ferrite magnets. Accordingly, although the rare earth element magnets can be magnetized to a certain depth from the magnet surface, deeper magnetization cannot be achieved in practice. This is a disadvantage inherent with the materials of the rare earth element magnets. That is, in the R-Fe-B type cylindrical magnets, even if magnetization is conducted under such conditions that all of the anisotropic portions inside the magnet should be completely magnetized theoretically, only part of such portions is completely magnetized actually. Hence, in view of the magnetizability of R-Fe-B type magnets, the present inventor conducted investigations in order to obtain a cylindrical magnet of high cost performance. As a result, it has been found that the ratio of the inner diameter ($D_1$) of the magnet to the outer diameter ($D_2$) should be determined as follows with respect to each number (P) of magnetic poles.

$$P=4: D_1/D_2 = 0.35 \text{ to } 0.85 \quad (1)$$

$$P=6: D_1/D_2 = 0.45 \text{ to } 0.85 \quad (2)$$

$$P=8: D_1/D_2 = 0.55 \text{ to } 0.85 \quad (3)$$

In each case of P=4, 6 and 8, when the value $D_1/D_2$ is smaller than the above lower limit, the surface magnetic flux density does not increase appreciably even if the thickness of the magnet is increased further. Meanwhile, when the value $D_1/D_2$ is larger than the above upper limit, the thickness of the magnet is too small, resulting in a difficult compacting operation and easy cracking.

Figure 5B:
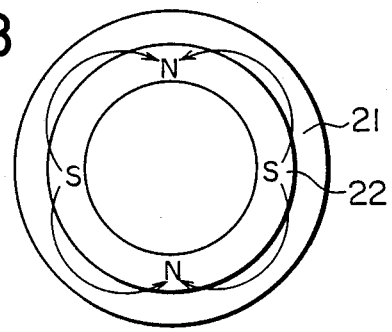

In the cylindrical magnet of the present invention, the multipolar anisotropy is provided at the inner surface in some cases, depending upon the type and application of the motor in which the cylindrical magnet is used. In such cases, a bushing 22 is fixed to the outer surface of a cylindrical magnet 21 to achieve cost reduction, as shown in FIG. 5(b). The cylindrical magnet having multipolar anisotropy at the inner surface also has restrictions in moldability and cracking; hence, its dimension is determined so as to satisfy the above formulas (1) to (3) to enhance the cost performance.

The cylindrical magnet of the present invention is ordinarily used in small-sized motors of the permanent magnet type. As such motors, there are, for example, (a) permanent magnet dc motors (e.g. coreless motor) in which a permanent magnet is used as a stator and a dc source is used at the rotor side and (b) permanent magnet rotor motors (e.g. synchronous motor, stepping motor, brushless motor) in which a permanent magnet is used as a rotor and the stator winding is separately excited or self-excited. When the cylindrical magnet of the present invention is used in these motors, the magnet has multipolar anisotropy at the outer or inner surface, depending upon the application of the motor in which the magnet is used. For example, a cylindrical magnet having 4 to 12 magnetic poles at the outer surface is used in encoder-equipped DC motors used for the positioning of hard disc drives and in capstan motors for streamer tape drives; and a cylindrical magnet having 4 to 12 magnetic poles at the inner surface is used in inner hub spindle motors for hard disk drives.

Figure 6:
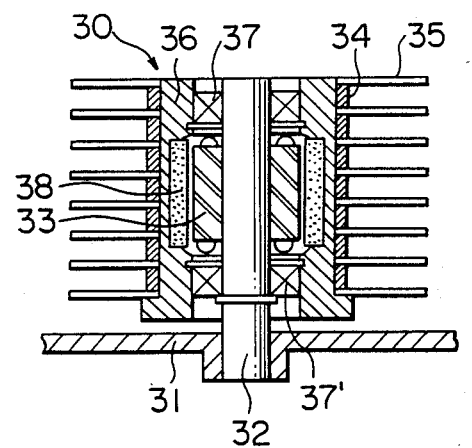
FIG. 6 is a sectional view showing an example of an inner hub spindle motor.

FIG. 6 shows an example of such inner hub spindle motors. A spindle motor 30 has a shaft 32 uprightly fixed to a substrate 31. A stator 33 is fixed at around the center of the the shaft 32. provided round the shaft 32 is a spindle 36 which supports a plurality of magnetic disks 35 arranged separately with spacers 34. The spindle 36 is supported by the shaft 32 via a pair of bearings 37 and 37'. Inside the spindle 36 is fixed a cylindrical magnet 38 having multipolar anisotropy at the inner surface, so that the magnet 38 faces a stator 33.

The cylindrical magnet of the present invention has multipolar anisotropy at the surface and accordingly a high surface magnetic flux density. Therefore, when it is used in various motors as mentioned above, the motors can have a high gap magnetic flux density and accordingly a high efficiency. Particularly when the cylindrical magnet of the present invention is used in the above-mentioned dc motors or spindle motors ordinarily using a cylindrical magnet having a radial anisotropy or an arc segment-shaped magnet, the resulting motors can exhibit an increased motor efficiency.

Figure 7:
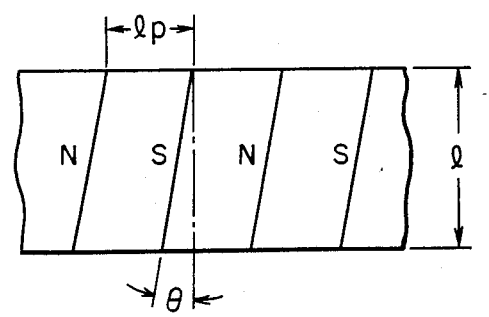
FIG. 7 is an expanded view showing part of a cylindrical permanent magnet having skewed magnet poles.

In motors using a permanent magnet, the magnetic reluctance between the stator and the rotor is varied by the rotation angle of the rotor. This produces a larger cogging i.e. variation in torque), and particularly when the magnet has a smaller number (4 to 8) of magnetic poles, the cogging is remarkably large. The cogging is proportional to the second power of the magnetic flux density; therefore, in order to make the cogging small, it is necessary to smoother the wave form of the magnetic flux in the circumferential direction at the gap portion. Hence, in the case of 4 to 8 magnetic poles, it is desirable to skew the magnetic poles against the axis, as shown in FIG. 7. The skewing angle $\theta$ is preferably at least 5° because too small a skewing angle provides a low effect. The skewing angle $\theta$ is appropriately determined depending upon the number of magnetic poles so that the two adjacent magnetic poles do not overlap with each other when viewed from below the paper. Hence, it is necessary that the skewing angle $\theta$ be smaller than the value satisfying $l\tan\theta = lp$ wherein l is magnet axial length and lp is the pitch between magnet poles.

Figure 8:
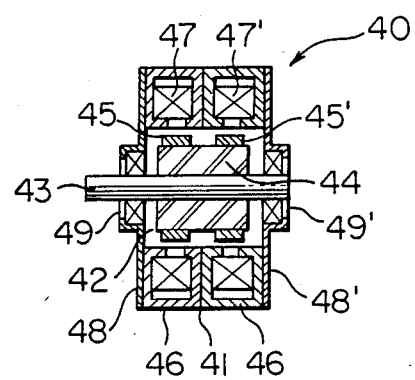
FIG. 8 is a sectional view showing an example of a PMtype stepping motor.

The cylindrical magnet of the present invention can also be used as a motor magnet having at least 10 magnetic poles. For example, in PM type stepping motors, there is widely used, as a rotor magnet, a cylindrical magnet having an outer diameter of 40 mm or below in order to make the size smaller, and a cylindrical magnet having at least 10 magnetic poles in order to make the stepping angle smaller. An example of the PM-type stepping motors is shown in FIG. 8. A stepping motor 40 has such a structure that there is accomodated, inside a stator 41, a rotor 42 comprising a pair of cylindrical magnets 45 and 45' mounted to a shaft 43 via a bushing 44. The stator 41 has a plurality of yokes 46 made of a soft magnetic material and having the same number of pole teeth as the number of magnetic poles, and a pair of coils 47 and 47' accomodated in the yokes. The rotor 42 supported by a pair of supporting panels 48 and 48' via bearings 49 and 49' is rotated stepwise by the rotating magnetic field generated by the sequential switching of the direction of electricity flowing in the coils.

Such a cylindrical permanent magnet for a rotor is required to have high magnetic properties, particularly a high surface magnetic flux density and a low inertia. Meanwhile, as shown in FIG. 4 of Japanese Pat. Laid-Open No. 57-199205, as the thickness "t" of magnet increases, the surface magnetic flux density increases but its inertia increases as well. Therefore, the cylindrical permanent magnet is required to have a low inertia without reducing the surface magnetic flux density $B_0$.

It has been found that the above requirements can be met by restricting the ratio T of the inner diameter of the permanent magnet to its outer diameter to satisfy the following relation:

$$T = D_1/D_2 = 1 - K_1(\pi/P)$$

wherein $D_1$ is the inner diameter of the magnet, $D_2$ is the outer diameter of magnet, P is the number of magnetic poles and is equal to at least 10, and $K_1$ is a constant of 1.0 or larger.

In the above formula, the ratio T of inner diameter to outer diameter is larger than 0 and smaller than 1.0; as T approaches 1.0, the magnet thickness "t" becomes smaller and the surface magnetic flux density $B_0$ becomes smaller; and as T approaches 0, the magnet thickness "t" becomes larger and the inertia becomes larger.

Also in the above formula, as the number P of the magnetic poles increases, the ratio T of inner diameter to outer diameter increases and the thickness "t" becomes smaller; and as P decreases, the thickness "t" increases.

Thus, it is possible to employ for a given number P of magnetic poles, an optimum ratio T of inner diameter to outer diameter without reducing magnetic properties.

The reason for adopting the above formula is explained below. When a cylindrical permanent magnet has P magnetic poles at the outer surface, the distance between magnetic poles (the distance between the centers of two adjacent magnetic poles of different polarities) along the circumference is $\pi D_2/P$. At least 90% of the magnetic flux is concentrated in a region from the surface to a depth half of the distance between the adjacent magnetic poles, and the remainder is distributed in an outside region to a depth of $K_1 \pi D_2/2P$. The $K_1$ (constant) is determined experimentally, as described later.

In a cylindrical permanent magnet, the thickness portion of the magnet into which no magnetic flux penetrates is ineffective and unnecessary. Even if portions of low magnetic flux density, i.e., portions which are not sufficiently anisotropic are included, the effective inner diameter of the magnet is only as large as represented by the following formula.

$$D_1 = D_2 - K_1(\pi D_2/P)$$

When the both sides of the above formula are divided by $D_2$, the following formula results.

$$D_1/D_2 = 1 - K_1(\pi/P)$$

Thus, the optimum value of the ratio T of inner diameter to outer diameter is represented by the above formula.

Figure 9:
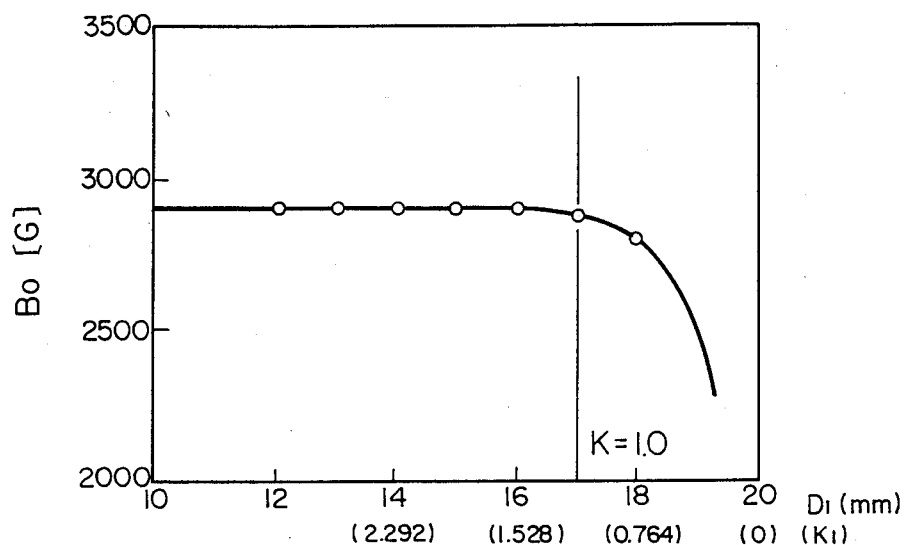
FIG. 9 is a graph showing a relationship between inner diameter of magnet, K and surface magnetic flux density.

Next, an example showing the experimental determination of $K_1$ is described referring to FIG. 9. FIG. 9 shows a relationship between inner diameter $D_1$, constant $K_1$ and surface magnetic flux density $B_0$ when the outer diameter $D_2$ is 20 mm and the number p of magnetic poles is 24.

As is clear from FIG. 9, $B_0$ is at least 98% of the maximum value when $K_1 \approx 1.0$ (the magnet thickness in the radial direction is half the distance between magnetic poles) and $B_0$ is saturated when $K_1$ is larger than 1.5. Considering that the magnet of the present invention is inexpensive and that a smaller thickness gives a lower inertia, $K_1$ of at least 1.0 and near 1.5 provides a high cost performance.

As mentioned previously, the cylindrical permanent magnet of the present invention can be obtained by sintering a cylindrical green body and then magnetizing the resulting sintered body. The dimensions of green bodies of various sizes and the resulting sintered bodies were measured to determine respective shrinkage ratios during sintering. The results showed that each of the outer diameter, inner diameter and length had a shrinkage ratio of about 14 to 16%. Therefore, when a cylindrical green body is sintered without any restriction, it turns into a polygon instead of a desired perfect circle as a result of shrinkage and deformation. The present inventor has investigated ways to prevent the problem and found that the deformation due to shrinkage can be prevented by inserting into the inside of the cylindrical green body a columnar core whose diameter $D_4$ is slightly larger than the inner diameter $D_3$ ("base inner diameter") of a sintered body obtained by sintering the green body without using the columnar core, and then sintering the green body. Such an effect by the use of a columnar core during sintering cannot be expected when the thickness of magnet is large, but when the ratio of inner diameter to outer diameter is within the above-mentioned range, there can be obtained a sintered body with a practically acceptable roundness. The diameter ($D_4$) of the above columnar core is appropriately determined so as to correspond to the inner diameter ($D_3$) of the sintered body. For example, when the inner diameter of the sintered body is about 15 to 20 mm, $D_4$ is preferably 1.01 to 1.17 times $D_3$. When $D_4$ is smaller than $1.01 \times D_3$, shrinkage and deformation cannot be prevented sufficiently. Even when $D_4$ is considerably larger than $D_3$, no cracks appear in the sintered body owing to the mechanical strength (ductility) of R-Fe-B type magnet material, but when $D_4$ is larger than $1.17 \times D_3$, the roundness of the inner diameter of the sintered body is reduced and the sintered body is warped. Incidentally, the columnar core is desirably made of a material of high rigidity and good heat resistance, such as austenite-type stainless steel.

As described above, according to the present invention there can be obtained a cylindrical permanent magnet having multipolar anisotropy at the surface and a high coercive force but no fear of cracking. According to the present invention, there can be further obtained a cylindrical permanent magnet of low cost and high cost performance, by combining with a bushing mad of a ferromagnetic material. There can furthermore be obtained a motor of small cogging by using a cylindrical permanent magnet having skewed magnet poles. According to the present invention, there can also be obtained a cylindrical permanent magnet of high dimensional accuracy by using a columnar core in sintering.

The present invention will be described in more detail below by way of Examples.

EXAMPLE 1

An alloy comprising 13 atomic % of Nd, 2 atomic % of Dy, 7 atomic % of B and 78 atomic % of Fe was prepared by means of vacuum melting. The alloy was then subjected to coarse pulverizing and fine pulverizing in this order in an $N_2$ gas atmosphere to obtain an alloy powder having an average particle size of 3 μm.

The alloy powder was subjected to compacting at a pressure of 1,000 kg/cm$^2$ while applying a pulse magnetic field of 20 KOe, using a compacting apparatus (for 24 magnetic poles) as shown in FIG. 2. The resulting green body was sintered in vacuum at 1,100° C. for 2 hours. The resulting sintered body was heat-treated in an Ar gas atmosphere at 600° C. for 1 hour. Thereafter, the outer surface of the sintered body was ground and magnetized so as to have 24 magnetic poles, whereby a cylindrical permanent magnet having an outer diameter of 20 mm and 24 magnetic poles at the outer surface was obtained. The surface magnetic flux density $B_0$ (average value of 24 magnetic poles) and the degree of cracking of the permanent magnet were examined and the results are shown in Table 1.

For comparison, there were prepared a cylindrical Sr ferrite magnet and a cylindrical rare earth element-cobalt magnet, each having the same dimension and number of magnetic poles as the above magnet. They were examined for surface magnetic flux density and cracking. The results are shown in Table 1. Incidentally, the ferrite magnet was prepared using substantially the same procedure as described in U.S. Pat. No. 4,547,758 and the rare earth element-cobalt magnet was prepared as follows. Each metal powder of Sm, Co, Fe, Cu and Zr was weighed accurately, and they were mixed, melted in an Ar atmosphere, and then cast. The resulting ingot was subjected to coarse pulverizing and fine pulverizing. The resulting powder was subjected to compacting at a pressure of 2,000 kg/cm$^2$ while applying a pulse magnetic field of 10 KOe, using a compacting apparatus of FIG. 2. The green body obtained was sintered in an $H_2$ atmosphere at 1,200° C. for 4 hours. The resulting sintered body was heat-treated by keeping at 1,180° C. for 4 hours, oil cooling, heating to 800° C., keeping at 800° C. for 4 hours, slowly cooling to 400° C. at a rate of 0.6° C./min, and keeping at 400° C. for 3 hours. The magnet obtained had a composition of $Sm(Co_{bal}Fe_{0.28}Cu_{0.052}Zr_{0.024})_{7.1}$.

TABLE 1

|  | Example 1 | Comparative Examples | |
|---|---|---|---|
|  |  | Ferrite Magnet | Rare Earth Element-Cobalt Magnet |
| $B_0$ (G) | 3,200 | 1,500 | 3,000 |
| Cracking | No | No | Yes (appeared during sintering) |

As is clear from Table 1, a cylindrical permanent magnet having a high surface magnetic flux density but no cracking could be obtained according to the present invention.

While the surface magnetic flux density of magnet varies depending upon the outer diameter, number of magnetic poles, etc. of the magnet, the cylindrical permanent magnet of the present invention gives a $B_0$ of 2,600 to 6,700 G when the number of magnetic poles is 4 to 48 and the outer diameter is 6 to 35 mm. This $B_0$ value is far higher than 1,300 to 1,500 G of the ferrite magnet under the same conditions. The rare earth element-cobalt magnet can show a $B_0$ of 2,600 to 3,400 G but cannot be used practically because it suffers from a tendency to develop cracks.

EXAMPLE 2

An alloy having a composition of $Nd_{0.96}Dy_{0.08}(Fe_{bal}B_{0.08})_{5.4}$ was prepared by means of vacuum melting. The alloy was subjected to coarse pulverizing and fine pulverizing in a $N_2$ gas atmosphere to obtain an alloy powder having an average particle size of 5 μm.

Figure 10:
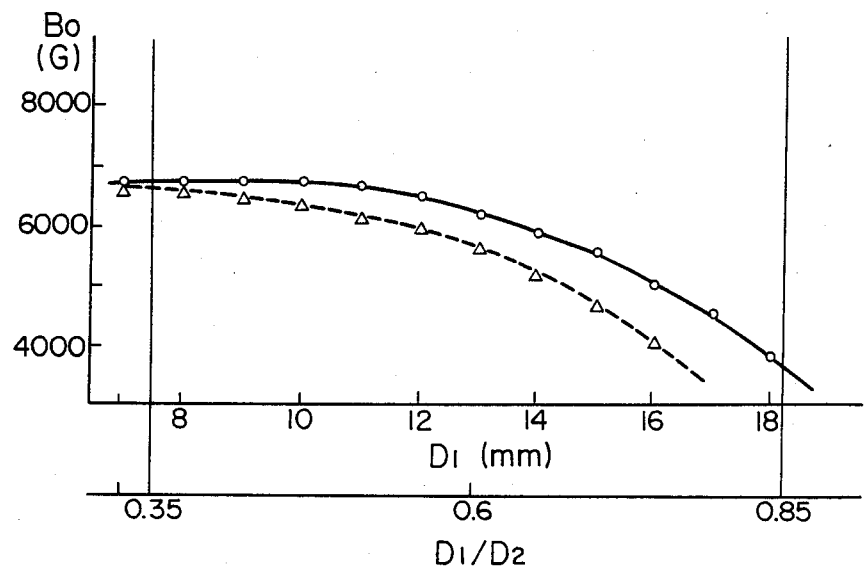
FIG. 10 and FIG. 11 are graphs showing the relationships between inner diameter of magnet, $D_1/D_2$ and surface magnetic flux density.

The alloy powder was subjected to compacting at a pressure of 700 kg/cm$^2$ while applying a pulse magnetic field of 20 KOe, using a compacting apparatus (for 4 magnetic poles) of FIG. 2. A plurality of green bodies having different tinner diameters were obtained by varying the outer diameter of the core of FIG. 2. These green bodies were sintered at 1,050° C. for 2 hours and then subjected to a two-stage heat treatment of 900° C.$\times$2 hours and 600° C.$\times$2 hours, in an Ar gas atmosphere. Then, the outer surface of each sintered body was ground and magnetized so as to have 4 magnetic poles, whereby cylindrical magnets of 21.45 mm in outer diameter and 10 mm in length and having 4 magnetic poles at the outer surface were obtained. Each cylindrical magnet was measured for surface magnetic flux density $B_0$ (average of 4 magnetic poles) and inner diameter $D_1$. Using the measurement data, the relationship between $B_0$ and $D_1$ and $D_1/D_2$ is shown in FIG. 10 in a broken line. With an iron bushing having an inner diameter of 5 mm fixed inside each of the above cylindrical magnets as shown in FIG. 5(a), each magnet was measured for surface magnetic flux density $B_0$. The relationship between this $B_0$ and $D_1$ and $D_1/D_2$ is shown in FIG. 10 in a solid line.

As is clear from FIG. 10, fixing of a bushing inside a magnet increases the surface magnetic flux density of the magnet by about 1,000 G at maximum, and the smaller the magnet thickness, the larger the increase of the surface magnetic flux density. Thus, the fixing of a bushing enables the use of a cylindrical magnet of smaller thickness. Incidentally, the bushing is not necessarily required when the outer diameter of magnet is not as large.

As is appreciated from FIG. 10, when using a bushing, the surface magnetic flux density $B_0$ is saturated when the inner diameter is 10 mm or below ($D_1/D_2 = 0.466$ or below). Meanwhile, when using no bushing, the surface magnetic flux density is saturated when the inner diameter is 7.5 mm or below ($D_1/D_2 = 0.35$ or below). Therefore, it is effective that a cylindrical magnet having an inner diameter of at least about 7.5 mm be used in a motor. It was confirmed, however, that when the inner diameter of magnet was about 18.2 mm or above ($D_1/D_2 = 0.85$ or above), the magnet was too thin to be formed and had cracks, meaning that it had no practical usability.

EXAMPLE 3

Figure 11:
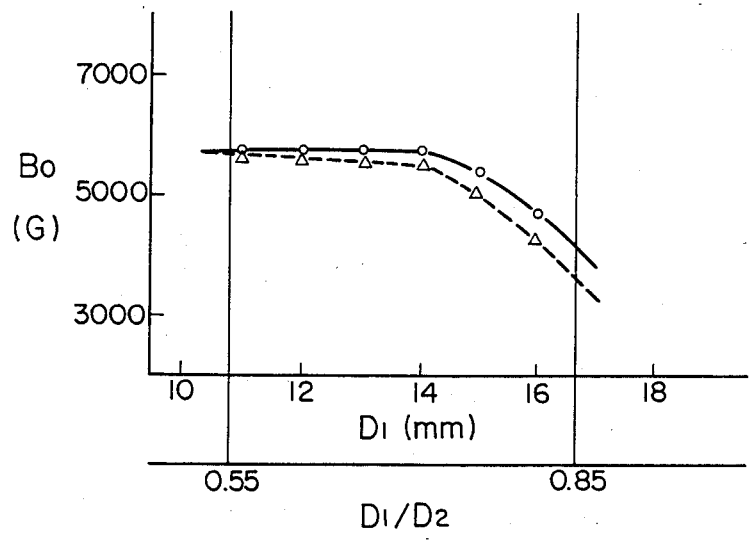

A cylindrical magnet of 19.6 mm in outer diameter and 8 mm in length and having 8 magnetic poles at the outer surface was obtained under the same conditions as in Example 2 except that the structure and dimension of the die of the compacting apparatus were changed and 8 magnetic poles were formed. The relationship between surface magnetic flux density $B_0$ and inner diameter $D_1$ and $D_1/D_2$, of the above cylindrical magnet is shown in FIG. 11 in a broken line. The relationship between surface magnetic flux density $B_0$ and inner diameter $D_1$ and $D_1/D_2$ when an iron bushing of 5 mm in inner diameter was fixed to the inside of the above magnet is shown in FIG. 11 in a solid line.

As is clear from FIG. 11, fixing of a bushing inside the cylindrical magnet increases the surface magnetic flux density of the magnet by about 500 G at maximum. When the outer diameter of the magnet is not as large, the bushing is not necessarily required.

As appreciated from FIG. 11, when using a bushing, the surface magnetic flux density $B_0$ is saturated when the inner diameter is 14 mm or below ($D_1/D_2 = 0.71$ or below). When using no bushing, the surface magnetic flux density is saturated when the inner diameter is about 10.75 mm or below ($D_1/D_2 = 0.55$ or below). Therefore, it is effective to use a cylindrical magnet having an inner diameter of at least about 10.75 mm. It was confirmed, however, that when the inner diameter of magnet was about 16.7 mm or above ($D_1/D_2 = 0.85$ or above), the magnet was not easy to form and suffered from cracks, and accordingly had no practical usability.

EXAMPLE 4

An alloy having a composition of $Nd_{0.90}Dy_{0.10}$-$(Fe_{bal}B_{0.08}Nb_{0.015})_{5.4}$ was prepared by means of vacuum pulverizing. The alloy was subjected to coarse pulverizing and fine pulverizing in an $N_2$ gas atmosphere to obtain an alloy powder having an average particle size of 5 μm.

The alloy powder was subjected to compacting at a pressure of 700 kg/cm$^2$ while applying a pulse magnetic field of 20 KOe, using a molding apparatus (for 12 magnetic poles) of FIG. 2 to obtain a green body of 28.48 mm in outer diameter, 20.71 mm in inner diameter and 12.24 mm in length. The green body was sintered at 1,100° C. for 2 hours to obtain a sintered body (No. 1) of 23.90 mm in outer diameter, 17.62 mm in inner diameter ($D_3$) and 10.35 mm in length. The shrinkage ratio was 16.1% (outer diameter), 14.9% (inner diameter) and 15.4% (length).

Separately, inside the above green body were inserted 7 different cores each made of SUS 304 and having a diameter ($D_4$) of 17.7 to 20.60 mm and a length of 20 cm (the surfaces of the cores had been subjected to an oxidation treatment to prevent sticking by sintering). Then, each green body was sintered under the same conditions as mentioned above, to obtain sintered bodies (Nos. 2 to 8). None of the sintered bodies had cracks.

The dimensional accuracies (expressed as an average of five samples) of the above sintered bodies are shown in Table 2.

TABLE 2

| No | Core $D_4$ (mm) | $D_4/D_3$ | Roundness of Inner Surface (mm) | Straightness of Inner Surface (mm) |
|---|---|---|---|---|
| 1 | — | — | 0.10 | 0.05 |
| 2 | 17.72 | 1.006 | 0.07 | 0.03 |
| 3 | 17.89 | 1.015 | 0.05 | 0.03 |
| 4 | 18.28 | 1.037 | 0.04 | 0.04 |
| 5 | 18.69 | 1.060 | 0.05 | 0.07 |
| 6 | 19.08 | 1.082 | 0.07 | 0.12 |
| 7 | 19.49 | 1.106 | 0.05 | 0.11 |
| 8 | 20.60 | 1.169 | 0.05 | 0.07 |

(The roundness and straightness of inner surface are defined in JIS B 0021.)

As is clear from Table 2, the sintered body (No. 1) obtained by using no core had an inner surface roundness of 0.1 mm while the sintered bodies (Nos. 2 to 8) obtained by using a core had an improved inner surface roundness of about 0.05 mm. However, there was a tendency that as the core diameter increased, the inner surface roundness decreased. Therefore, the core diameter can be appropriately determined by taking into consideration the dimensional accuracy required for the sintered body obtained. Incidentally, the above sintered bodies were heat-treated under the same conditions as in Example 2 and, after outer surface polishing, were magnetized so as to have 24 magnetic poles at the outer surface. The resulting cylindrical magnets had a $B_0$ of 3,200 G or more.

The present invention has been explained referring to the Examples, but it should be noted that any modifications can be made unless they deviate from the scope of the present invention which is defined by the claims attached hereto.

What is claimed is:

1. A cylindrical permanent magnet containing, as major components, R (R is at least one rare earth element selected from Nd, Pr, DY, Ho and Tb and may further contain at least one rare earth element selected from La, Ce, Sm, Gd, Er, Eu, Tm, Yb and Y), b and Fe, and having circumferential multipolar anisotrophy at a cylindrical surface, said major components being present in amounts of 10 to 30 atomic % of R, 2 to 28 atomic % of B, and 65 to 80 atomic % of Fe, wherein the number of magnetic poles (P) is 4 to 8; and wherein the inner diameter ($D_1$) and the outer diameter ($D_2$) have the relationship represented by the following formulas (1) to (3):

$$p=4: D_1/D_2 = 0.35 \text{ to } 0.85 \quad (1),$$

$$p=6: D_1/D_2 = 0.45 \text{ to } 0.85 \quad (2),$$

and $$p=8: D_1/D_2 = 0.55 \text{ to } 0.85 \quad (3).$$

2. A cylindrical permanent magnet containing, as major components R (R is at least one rare earth element selected from Nd, Pr, Dy, Ho and Tb and may further contain at least one rare earth element selected from La, Ce, Sm, Gd, Er, Eu, Tm, Yb and Y0, B and Fe, and having circumferential multipolar anisotrophy at a cylindrical surface, said major components being present in amounts of 10 to 30 atomic % pf R, 2 to 28 atomic % of B, and 65 to 80 atomic % of Fe, wherein the number of magnetic poles is 10 to 48, and wherein the ratio of the inner diameter ($D_1$) to the outer diameter ($D_2$) has the relationship represented by the following formula (4) with the number of magnetic poles (P) when P is 10 to 48:

$$D_1/D_2 = 1 - K(\pi/P) \quad (4)$$

(K is a constant of at least 1.0).

3. The cylindrical permanent magnet according to claim 2, wherein each magnetic pole is inclined against the axis by at least 5° when the number of magnetic poles (P) is 4 to 8.

4. A permanent magnet assembly comprising a cylindrical permanent magnet having a reduced radial thickness and bushing means substituting for the reduction in the radial thickness of said permanent magnet, said permanent magnet containing, major components, R (R is at least one rare earth element selected from Nd, Pr, Dy, Ho and Tb and may further contain at least one rare earth element selected from La, Ce, Sm, Gd, Er, Eu, Tm, Yb and Y), B and Fe and having circumferential multipolar anisotropy at the surface, said major components being present in amounts of 10 to 30 atomic % of R, 2 to 28 atomic % of B, and 65 to 80 atomic % of Fe, wherein a large number magnetic poles are formed at one cylindrical surface of said cylindrical permanent magnet.

5. The permanent magnet assembly according to claim 4, wherein the magnetic poles are formed on the outer cylindrical surface of said cylindrical permanent magnet and which has on the inner cylindrical surface a cylindrical bushing made of a ferromagnetic material.

6. The permanent magnet assembly according to claim 4, wherein the magnetic poles are formed on the inner cylindrical surface of said cylindrical permanent magnet and which has on the outer cylindrical surface a cylindrical bushing made of a ferromagnetic material.

7. A dc motor for hard disk drive, comprising a cylindrical permanent magnet containing, as major components, R (R is at least one rare earth element selected from Nd, Pr, Dy, Ho and Tb and may further contain at least one rare earth element selected form La, Ce, Sm, Gd, Er, Eu, Tm, Yb, and Y), B and Fe and having 4 to 8 magnetic poles circumferentially disposed at the outer cylindrical surface, said major components being present in amounts of 10 to 30 atomic % of R, 2 to 28 atomic % of B and 65 to 80 atomic % of Fe, and wherein the inner diameter ($D_1$) and the outer diameter ($D_2$) of the cylindrical permanent magnet have the relationship represented by the following formulas (1) to (3):

$$P=4: D_1/D_2 = 0.35 \text{ to } 0.85 \quad (1),$$

$$P=6: D_1/D_2 = 0.45 \text{ to } 0.85 \quad (2),$$

and $$P=8: D_1/D_2 = 0.55 \text{ to } 0.85 \quad (3).$$

8. A motor according to claim 7, wherein each magnetic pole is inclined against the axis of the magnet by at least 5° when the number of magnetic poles (P) is 4 to 8.

9. A capstan motor for streamer tape drive, comprising a cylindrical permanent magnet containing, as major components, R (R is at least one rare earth element selected from Nd, Pr, Dy, Ho and Tb and may further contain at least one rare earth element selected from La, Ce, Sm, Gd, Er, Eu, Tm, Yb and Y), B and Fe and having 4 to 8 magnetic poles circumferentially disposed at the outer cylindrical surface, said major components being present in amounts of 10 to 30 atomic % of R, 2 to 28 atomic % of B and 65 to 80 atomic % of Fe, and wherein the inner diameter ($D_1$) and the outer diameter ($D_2$) of the cylindrical permanent magnet have the relationship represented by the following formulas (1) to (3):

$$P=4: D_1/D_2 = 0.35 \text{ to } 0.85 \quad (1),$$

$$P=6: D_1/D_2 = 0.45 \text{ to } 0.85 \quad (2),$$

and $$P=8: D_1/D_2 = 0.55 \text{ to } 0.85 \quad (3).$$

10. The capstan motor according to claim 9, wherein each magnet pole is inclined against the axis of the cylindrical permanent magnet by at least 5° when the number of magnet poles (P) is 4 to 8.

11. An inner hub spindle motor for hard disk drive, comprising a cylindrical permanent magnet containing, as major components, R (R is at least one rare earth element selected from Nd, Pr, Dy, Ho and Tb and may further contain at least one rare earth element selected from La, Ce, Sm, Gd, Er, Eu, Tm, Yb and Y), B and Fe and having 4 to 8 magnetic poles circumferentially disposed at the inner cylindrical surface, said major components being present in amounts of 10 to 30 atomic % of R, 2 to 28 atomic % of B and 65 to 80 atomic % of Fe, and wherein the inner diameter ($D_1$) and the outer diameter ($D_2$) of the cylindrical permanent magnet have the relationship represented by the following formulas (1) to (3):

$$P=4: D_1/D_2 = 0.35 \text{ to } 0.85 \quad (1),$$

$$P=6: D_1/D_2 = 0.45 \text{ to } 0.85 \quad (2),$$

and $$P=8: D_1/D_2 = 0.55 \text{ to } 0.85 \quad (3).$$

12. The inner hub spindle motor according to claim 11, wherein each magnetic pole is inclined against the axis of the cylindrical permanent magnet by at least 5° when the number of magnet poles (P) is 4 to 8.

13. A process for producing a cylindrical permanent magnet, which comprises filling a cylindrical cavity with an alloy powder containing, as major components, R (R is at least one rare earth element selected from Nd, Pr, Dy, Ho and Tb and may further contain at least one rare earth element selected from La, Ce, Sm, Gd, Er, Eu, Tm, Yb and Y), B and Fe, subjecting the powder filled in the cavity to compacting while applying a pulse magnetic field to obtain a cylindrical green body having circumferential multipolar anisotropy at the surface, inserting into the inside of the cylindrical green body a column whose diameter is slightly larger than the inner diameter of a sintered body that would result if the column were not used, herein defined as the base inner diameter, and then sintering the green body, heat-treating the resulting sintered body, and magnetizing the surface of the sintered body in the same direction as the magnetic poles formed at the surface.

14. The process for producing a cylindrical permanent magnet according to claim 13, wherein the alloy powder contains, as major components, 10 to 30 atomic % of R, 2 to 28 atomic % of B and 65 and 80 atomic % of Fe.

15. The process for producing a cylindrical permanent magnet according to claim 13, including the preliminary step of providing a test permanent magnet without using an insertable column for determining the base inner diameter.

16. The process for producing a cylindrical permanent magnet according to claim 13 wherein said inserting step includes the step of selecting a column having a diameter of about 1.01 to 1.17 times the base inner diameter, for cylindrical permanent magnets having inner diameters of about 15 mm to 20 mm.

* * * * *

UNITED STATES PATENT AND TRADEMARK OFFICE
CERTIFICATE OF CORRECTION

PATENT NO. :  4,888,512

DATED :  December 19, 1989

INVENTOR(S) :  MOTOHARU SHIMIZU

It is certified that error appears in the above-identified patent and that said Letters Patent is hereby corrected as shown below:

Claim 1, column 12, line 61, change "DY" to --Dy--.

Claim 1, column 12, line 63, change "b" to --B--.

Claim 2, column 13, line 15, change "YO" to --Y)--.

Signed and Sealed this

Ninth Day of October, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO.   : 4,888,512
DATED        : December 19, 1989
INVENTOR(S)  : SHIMIZU It is certified that error appears in the above-identified patent and that said Letters Patent is hereby corrected as shown below:

Claim 1, column 12, line 64, "anisotrophy" should read --anisotropy--; and

Claim 2, column 13, line 26, "=" (second occurrence) in the formula should read -- - --.

Signed and Sealed this

Sixth Day of June, 1995

Attest:

BRUCE LEHMAN

Attesting Officer    Commissioner of Patents and Trademarks